April 9, 1929.  B. B. HOLMES  1,708,093
ELECTRIC MOTOR
Original Filed July 26, 1926
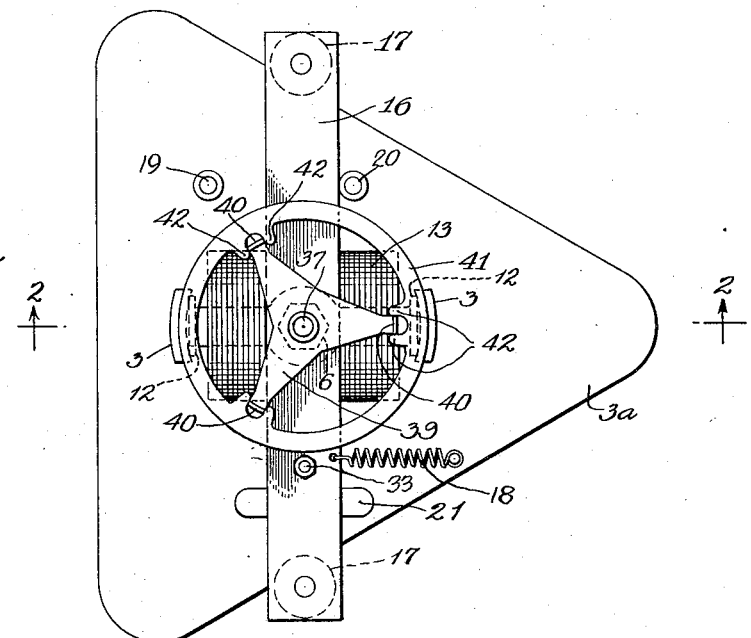
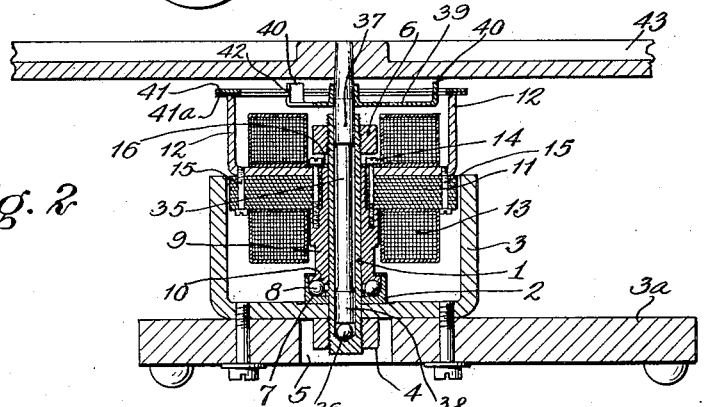
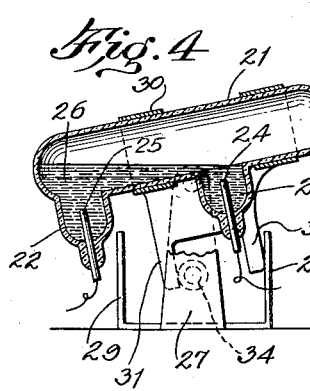
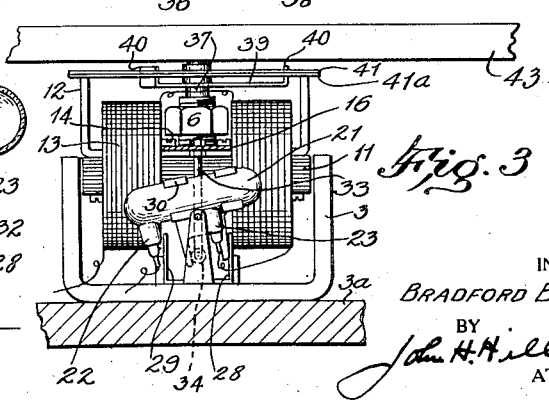
INVENTOR
BRADFORD B. HOLMES
BY
John H. Hilliard
ATTORNEY Patented Apr. 9, 1929.

1,708,093

UNITED STATES PATENT OFFICE.

BRADFORD B. HOLMES, OF STONINGTON, CONNECTICUT.

ELECTRIC MOTOR.

Application filed July 26, 1926, Serial No. 124,794. Renewed December 31, 1927.

My invention relates to electrically operated motors of a type capable of being driven if desired at extremely low speeds. In the construction which I have selected as the preferred embodiment of the invention, the primary actuating mechanism consists of a rotatably mounted electro-magnetic armature which, when electrically excited, seeks by magnetic attraction a definite angular position determined by the position of a suitable pole piece of soft iron or other magnetically non-retentive material located in the field of the armature. Normally, however, the armature is deflected from this definite position by a spring or other elastic means. It is contemplated that the current which actuates the armature shall be sufficient to produce in it a turning moment which shall exceed that exerted by the spring which acts counter to it. An automatic switching device controls the time of closing and breaking the circuit thru the coils of the armature, and also the duration of current flow. The switching device in itself is of a well-known type and for that reason need not be here considered in detail. It is sufficient to note that it closes the circuit when the armature is in deflected position, keeps it closed until the armature, actuated by the magnetic field consequently produced, rotates against the tension of the spring to a position in line with the pole piece, and then breaks the circuit, releasing the magnetic tension. The spring then causes the armature to reverse its direction of rotation, the circuit remaining broken until the armature reaches a predetermined position, when the circuit is again closed and the oscillation repeated. Thus an oscillatory motion of the armature is set up.

One of the alternations of the oscillatory motion of the armature, preferably that controlled by the magnetic attraction between the armature and its poles, being itself unidirectional, is utilized to impart a power impulse, and consequently uni-directional rotation, to the rotor from which power may be taken for any purpose suited to the characteristics of the motor. The instrumentality for the purpose comprises a pole piece carried by the rotor so constructed and located as to serve, in any angular position which the rotor may be occupying, as a shunt path for part of the flux in the armature core. The pole piece, while normally free from the armature, is adapted to be drawn into as close frictional contact with the latter as the magnetic force of attraction will compel, and being non-rotatably mounted on the rotor, each successive power impulse is imparted to the rotor and uni-directional rotation of the latter results. If uniform or substantially uniform velocity is required in the rotor it may be provided with a fly wheel or its motion otherwise smoothed out by suitable loading.

The main object of the invention is a rotor of the type above referred to which will have the characteristics described. More specific objects are the construction of a motor of this type that will be cheap to manufacture and to operate, simple in construction and requiring infrequent repairs.

The construction of a suitable method and means of converting the oscillatory motion of the armature into rotary motion of the rotor also forms an important object of the invention, and the particular means of effecting this object is an important feature.

With reference to the specific construction, another object is to provide means in motors of the type above referred to in which the flux or part of the flux in the armature may be made use of to operate a one-way clutching device for imparting to the rotor one-way impulses of the oscillating armature.

With reference to commercial application, another object of the invention is the construction of a low-speed electric motor that will be suitable for operating revolving advertising display shelves, barber signs, and the like.

Referring to the drawings:

Figure 1 is a plan view of the motor with the fly wheel removed.

Figure 2 is a view in section on the line 2—2 of Figure 1.

Figure 3 is a side elevation of the motor.

Figure 4 is a longitudinal vertical section of the automatic switch which controls the making and breaking of the current through the coils of the oscillating armature.

The support for the rotating parts, namely, the oscillating armature and the rotor comprises a bushing 1 provided with a flange 2 which rests upon the U-shaped pole piece 3. The bushing 1 is firmly held in an upright position on the base 3ª by means of the nut 4, the base being provided with an aperture 5 to accommodate the nut and the projecting end of the bushing 1. The bushing 1 may also be provided with another nut 6 to prevent accidental withdrawal of the rotating parts. The flange 2 is provided with a ball race 7 in which the balls 8 travel, thus serving as a bearing for the sleeve 9 which is also provided with a complementary upper ball race 10. The electro-magnetic armature comprises a core made up in the usual manner of the laminations 11 and also of the U-shaped shunt plate 12, the latter serving to shunt a portion of the flux in the armature core when the coils 13, which are as usual wound in series, are electrically excited. The armature core is retained on the sleeve 9 by screws 14 and the outer ends of the core are clamped together by the screws 15. The U-shaped pole piece 3 and the shunt plate 12 are, of course, of magnetic material and for the most perfect working of the motor the material of which they are composed is as non-retentive of magnetism as possible. Obviously when the armature motor is magnetically excited, the armature seeks a position in line with the pole piece 3. The armature is also provided with a governor comprising a cross bar 16 which is loaded at its free ends with weights 17 shown in dotted lines in Figure 1. A spring 18 normally causes the armature to be deflected from its position in line with the pole piece 3 although the spring does not exert sufficient tension to counteract the magnetic attraction of the armature core to the pole piece 3 when the former is magnetically excited. In fact the strength of spring required is only that sufficient to cause rotation of the armature through a small angle which is fixed by the stops 19 and 20, the stop 20 serving as a check to the rotation of the armature when electrically excited and the stop 19 serving as a check to the reverse motion of the armature when the current is broken and the spring 18 is in action. The weights 17 are provided merely for the purpose of damping the speed of rotation of the armature under the action of the spring 18 for the special commercial purposes for which the motor is designed, for, it will be understood, the desirability or non-desirability of thus damping the motion of the armature is a matter of choice depending upon the speed of oscillation which may be required for a particular use of the motor. The means for making and breaking the circuit through the armature comprises an automatically operating electric switch of conventional type such as that shown in Figures 3 and 4. The switch consists of a tube 21 containing two small wells 22 and 23 into which project the terminals 24 and 25 leading with the source of current. The tube contains a small quantity of mercury 26 and is pivoted on the support 27 as shown in Figures 3 and 4. As the switch is tipped in a clockwise direction, the mercury 26 flows in the same direction breaking the contact with the mercury in the well 22, thus opening the circuit. As the switch is tipped in a counter clockwise direction, it assumes the position shown in Fig. 4, the mercury being unbroken and the circuit consequently closed. The upright ears 28 and 29 are mounted on the base and serve as stops to limit the throw of the switch in each direction. The switch is mounted in a frame 30 and is provided with depending ears 31 and 32, the depending ear 32 being adapted to contact with the ear 28 and thus limit the throw of the switch in a counter clockwise direction, and depending ear 31 being adapted to contact with the stop 29 and limit the throw of the switch in a clockwise direction. The time of throwing the switch is determined by the motion of the arm 33 depending from the governor 16 and preferably provided with a roller 34 adapted to contact with each of the ears 31 and 32. As the governor 16 (referring to Figure 1) rotates in a clockwise direction the roller 34 causes the switch to swing in a clockwise direction and when the center of gravity of the mercury in the switch has been sufficiently shifted, the latter tilts suddenly, causing the mercury to part and the current to be broken. Thereupon, the armature being demagnetized rotates in an anti-clockwise direction under the action of the spring 18 causing the switch to tilt in an anti-clockwise direction until the two bodies of mercury have become joined whereby the circuit is closed through the armature and the latter is caused to rotate in a clockwise direction. The stops 19 and 20 serve to definitely limit the amplitude of motion of the armature, both stops however being placed slightly without the range of motion of the armature as determined by the time of making and breaking the circuit. By so placing them ample margin is allowed for proper action of the switch and at the same time they prevent the armature from exceeding a certain predetermined throw.

The rotor comprises a spindle 35 rotatably mounted in the tubular bushing 1, a ball 36 serving as a step bearing if desired. The diameter of the spindle between its bearing surfaces 37 and 38 may be reduced in diameter and filled with oil, and since the tubular bushing 1 is oil tight obviously a single oiling will last for a very long time.

On the spindle 37 is mounted a spider 39 with upturned ears 40 which interlock with the plate 41 by means of the studs or ears 42.

The plate 41 is composed of magnetic material, preferably as non-retentive of magnetism as possible, and while it is mounted non-rotatively with respect to the spindle, it merely rests upon the magnetic shunt piece 12 of the armature. The magnetic shunt piece 12 and the plate 41 comprise, it will be seen, a closed magnetic circuit for a part of the flux of the armature core. When the armature core is magntically excited by the closing of the current through the armature coils the plate 41 is drawn down by magnetic attraction into close frictional engagement with the shunt piece 12 and the rotation of the armature under magnetic force consequently produces rotation of the spindle 35. When the current through the armature coils is broken and the armature begins its anti-clockwise alternation under the action of the spring 18, the plate 41 is immediately freed from its close frictional contact with the shunt piece 12 and consequently the anti-clockwise motion of the armature is not communicated to the spindle. This result is more perfectly accomplished by providing a fly wheel 43 of sufficient inertia to resist the very slight friction which would result merely from the weight of the plate 41 as it rests on the shunt piece 12. It has been found in practice that residual magnetism in the plate 41 prevents complete release of the plate from close frictional contact with the shunt piece 12 with desired promptness, and, therefore, it is frequently necessary to insert a separating plate 41ª between the plate 41 and the shunt piece 12. This plate is of non-magnetic material such as brass, fiber, or in fact any material which will resist friction. By reason of the presence of this plate, the small residual magnetism which characterizes the best standard commercial magnetic core material is insufficient to cause any binding or holding as between the shunt piece 12 and the plate 41 during the alternation of the armature when the circuit through coils is broken. The fly wheel has a further function which is important when uniform rotating motion of the rotor is required, that is to say—the function of smoothing the motion of the rotor over the alternations of the armature. A display rack or display shelves may conveniently be mounted on the fly wheel 43.

When the switch 20 is tilted a short interval of time is required before the mercury runs from one end of the switch to the other. Therefore, there is an interval after the switch is thrown before the electrical contact is made or broken. This fact, taken in conjunction with the positions of stops 19 and 20, is utilized as one means for governing the speed of the machine. If the machine is running slowly, the electrical contact will be broken before arm 16 hits stop 20 and the entire electrical impulse is utilized in speeding up the machine. If the machine rotates too fast, the arm 16 will hit stop 20 before the electrical contact is broken. For a brief instant clutch plate 41 will drag on shunt piece 12 before the magnetic bond is broken, acting as a brake and slowing the machine down. The machine will finally reach a speed where the electrical contact is broken at substantially the instant arm 16 hits the stop 20. This feature serves to maintain practically constant speed irrespective of whether the machine is running light or fully loaded. The accomplishment of this result constitutes another object of the invention.

Obviously various changes and modifications from the structure as I have described it may be made in spite of which the objects will be accomplished in substantially the same way as described. Consequently the full scope of the invention is to be considered as defined in the following claims.

I claim:

1. In a motor a rotatably mounted electromagnetic armature, means for causing rotative motion of said armature, a rotor mounted independently of said armature and carrying a pole piece adapted to form at any angular position of the rotor part of a magnetic flux path shunted from said armature and to be drawn by magnetic attraction into close frictional engagement with said armature when the latter is electrically excited and to be free from the same at other times.

2. In a motor a rotatably mounted electromagnetic armature, means for causing oscillatory motion of said armature, the said means comprising an automatic switching device adapted to impart motion thereto in one direction by magnetic attraction, and a spring adapted when the current in the armature is broken to impart motion in a counter direction, a rotor mounted independently of said armature carrying a pole piece adapted to form at any angular position of the rotor part of a magnetic flux path shunted from said armature and to be drawn by magnetic attraction into close frictional engagement with said armature when the latter is electrically excited and to be free from the same at other times.

3. In a motor an oscillator comprising an electro-magnetic armature, a stationary pole piece so located as to maintain the armature when electrically excited at a definite angular position, elastic means adapted normally to cause deflection of said armature from said position, a rotor mounted to rotate on the axis of rotation of the armature, but independently thereof, a pole piece non-rotatably carried by said rotor and adapted to form at any angular position of said rotor part of a flux path shunted from said armature, and also adapted to be brought into frictional engagement with said armature to form a clutch connection for transmitting rotary motion from the armature to the rotor during periods of electric excitation of the armature, and means for closing the circuit thru the armature when it has been deflected from said definite angular position by said elastic means and for again breaking the said circuit when the armature has swung to said definite position.

4. In a motor an oscillator comprising an electro-magnetic armature, a stationary pole piece so located as to maintain the armature when electrically excited at a definite angular position, elastic means adapted normally to cause deflection of said armature from said position, a rotor mounted to rotate on the axis of rotation of the armature, but independently thereof, a pole piece non-rotatably carried by said rotor and adapted to form at any angular position of said rotor part of a flux path shunted from said armature and also adapted to be brought into frictional engagement with said armature to form a clutch connection for transmitting rotary motion from the armature to the rotor during periods of electrical excitation of the armature, and means for closing the circuit thru the armature when it has been deflected from said definite angular position by said elastic means and for again breaking the said circuit when the armature has swung to said definite position, and means for damping the motion of said armature under the influence of said elastic means.

5. In a motor of the type comprising a rotor actuated by an oscillatory electro-magnetic armature, a one-way clutch device for transmitting power from the armature to the rotor to produce uni-directional rotation of the latter, comprising a magnetic pole piece carried by the rotor and forming at all angular positions of the rotor a part of a magnetic flux path shunted from the armature, said pole piece being adapted to be drawn by magnetic attraction into non-slipping contact with said armature when the latter is electrically excited, and to be free from said armature at all other times.

6. In a motor a rotatably mounted electro-magnetic armature, a pole piece arranged to cause said armature when electrically excited to assume a definite angular position, elastic means tending normally to deflect said armature from said position, a switching device to close the electric circuit thru said armature when the latter is deflected and to open said circuit when it assumes said definite position, thus producing the oscillatory motion of said armature, a rotor mounted independently, of said armature, a part of said rotor comprising a plate of magnetic material adapted and positioned to form part of a flux path shunted from the armature at any position of the rotor, said plate being adapted to come into close frictional engagement with said armature when the latter is magnetically excited, and means for closing the circuit thru said armature when it is in deflected position and maintaining the said circuit closed until said armature assumes said definite position.

7. In a motor an oscillator and a rotor both mounted independently of each other for rotative movement on the same axis, the oscillator comprising an electro-magnetic armature, a stationary pole piece of small residual magnetism so located with relation to said armature as to give the maximum intensity of magnetic flux in the field of said armature at a predetermined angular position thereof, elastic means normally tending to withdraw the armature from said position, a one-way clutch connection between said oscillator and said rotor comprising a plate of small residual magnetism non-rotatably attached to said rotor and normally free from said armature and forming part of a shunted path for the magnetic flux of said armature and adapted to be drawn into positive frictional engagement with said armature when the latter is electrically excited.

8. In a motor a rotatably mounted electro-magnetic armature, means for causing alternating motion of said armature, a rotor mounted independently of said armature and a one way clutching device for transmitting uni-directional motion from said armature to said rotor said device comprising a pole piece adapted to form at any angular position thereof part of a magnetic flux path shunted from said armature.

9. In a motor a rotatably mounted electro-magnetic armature, means for causing oscillating motion of said armature said means comprising a switching device adapted to close the circuit therethrough and to keep the same closed while the armature rotates through a definite angle, a rotor and a one way clutching device for communicating to the rotor motion of one way alternations of the armature said clutching device comprising a pole piece formed by a flux path shunted from the armature core and rotatable with said armature when the latter is electrically excited.

10. A constant speed motor comprising a rotor, an electro-magnetic oscillating armature independent of the rotor, fixed pole pieces for the rotor, a one way clutch connection between the armature and the rotor, said clutch connection being controlled by a magnetic shunt from the armature core, elastic means tending to rotate the armature in one direction, a substantially constant time switch adapted to be operated by the motion of the armature to alternately make and break the circuit thru said armature, and hence to cause the same alternately to rotate against and with said elastic means, and to operate said clutch while the circuit is closed, a stop for limiting the motion of the armature before the time switch has been completely actuated when said armature is rotating at more than predetermined speed.

In testimony whereof, I have signed this specification.

BRADFORD B. HOLMES.